Sept. 6, 1960                J. W. ANDERSON                2,951,354
                             UNIVERSAL JOINT
                            Filed Oct. 29, 1956

INVENTOR.
JOHN W. ANDERSON
BY Redross & Rechtenwald
ATTORNEYS

United States Patent Office 2,951,354
Patented Sept. 6, 1960

2,951,354

UNIVERSAL JOINT

John W. Anderson, 578 Broadway, Gary, Ind.

Filed Oct. 29, 1956, Ser. No. 618,917

8 Claims. (Cl. 64—14)

This invention relates to a coupling for transmitting energy and more particularly to a coupling that forms a flexible or universal joint for transmitting rotary motion.

The structure includes elements adpted to be connected to a driving and driven means with a deformable resilient connector disposed therebetween. Preferably this connector takes the form of a rubber block that is positioned between two interlocking looped means in such a manner that the block is trapped and made to carry extreme loads, but yet is readily deformable to accommodate a certain degree of the driving and driven means. This construction provides an improved flexible joint wherein shock loads are positively dampened and dissipated because of the cooperation between the interlocked loop means and the trapped deformable resilient block.

The driving and driven means are normally disposed approximately in line while the interlocked looped means are normally rotated to be spaced apart at about right angles with respect to each other to provide maximum spacing between the elements. The rubber block cooperates with the interlocked loops as above explained to not only smooth out power surges in the drive line, but to dampen unusual longitudinal forces also.

For a more complete description of this invention reference may be had to the following description and the drawings, in which.

The invention here shown may find application in various mechanical drive situations and the present disclosure should be taken as merely a typical example of such a use. In this construction, the device is shown as being incorporated in a powdered drive mechanism such as might be used in a power-operated window lift for an automobile door, wherein a rotary drive motion is converted to a reciprocating motion to raise and lower a window.

Figure 1:
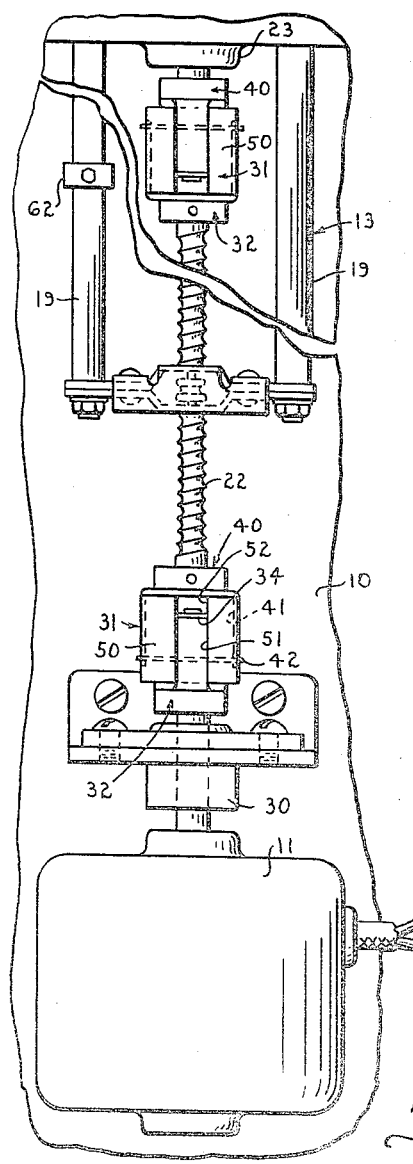
Figure 1 is a front elevation of a screw-feed device showing a typical application of this invention in normal use.

Referring to Figure 1, a portion of an automobile door is represented and the door panel 10 is designed to support a motor 11 for driving the window lift operation, the motor being supported from the door on a fixed bracket 12. The motor is adapted to drive a mechanism for reciprocating the carriage 13 which at its upper end is connected to the window so that it is driven up or down as the carriage 13 is reciprocated through the bearing 14 carried by the door panel.

The carriage structure may include a pair of vertically extending sliding rod elements 19 which are connected at their upper ends to the window to be moved and at their lower end by means of a generally rigid bridge element 20. The bridge element 20 includes a housing 21 which is adapted to surround a threaded member 22, the housing 21 enclosing a frictionless nut means for engaging the threaded member 22 whereby the housing and bridge member are carried with the nut element as it progresses either up or down when the threaded member 22 is rotated. A suitable thrust bearing 23 may be provided to rotatably support the threaded drive member at its upper end on the door panel 10.

Preferably the nut means includes a plurality of rotatably mounted bearing elements 24 each of which has a pair of toroidal surfaces 25 which engage the screw-threaded element 22 in a manner to embracingly engage the periphery of the threaded element. The bearing elements 24 are rotatably mounted about generally vertical axes in the housing 21 so that they may rotate about their respective axes within the housing as the shaft 22 is rotated, however, functionally they form a relatively fixed threaded means such as a nut element to effect movement of the bridge element 20 because of their cooperation with the threaded member.

The motor 11 may be drivingly connected to the threaded member 22 by any suitable driving connection 30 so that rotary motion is transmitted from the motor through the connection 30 to the lowermost of the universal joints 31. Preferably corresponding universal joint means 31 are disposed at opposite ends of the rotatably mounted shaft 22 for a purpose that will be described more fully below.

The universal joint 31, which forms the subject of this invention, includes a pair of interlocked looped elements which are held in spaced position. Thus the drive through connection 30 from the motor 11 is connected to the U-shaped driving element 32 of the universal joint, the driving element 32 having integral arm elements 33 which are adapted to cooperate at their uppermost ends with the staking bar 34. The generally U-shaped driven element 40 of the universal joint likewise has a pair of integral arm means 41 which are adapted to cooperate at their lowermost ends with a staking bar 42. The driving and driven elements are adapted to be assembled with their respective staking bars 34 and 42 disposed within the loop formed by mounting the staking bar on the integral arms of the other element whereby the driving and driven elements may be coupled together in the form of interlocked loop means. The generally vertically extending arms 33 and 41, as here shown, are normally spaced approximately 90° apart and staking bars 34 and 42 are adapted to be spaced longitudinally one within the loop formed by the other means so that the driving and driven means are positioned with their closed loop elements interlocked, but in spaced relation one with respect to the other.

Within the space thus formed between the loop portions of the driving and driven elements, a spacer 50 is adapted to be seated, the spacer 50 being formed of a resilient deformable rubberlike material. The spacer 50 has a generally cylindrically shaped side wall with flat end walls. The spacer 50 is provided with vertical channels 51 in the side wall for cooperating with arms 33 of the driving means 32 and has a connecting channel 52 disposed in one end which joins channels 51 and which is adapted to receive the stake bar 34. Stake bar 34 is designed to be fixedly mounted on the ends of arms 33. Another pair of vertical channels 53 are provided in the wall of spacer element 50 disposed at about 90° with respect to channels 51, the channels 52 being adapted to receive arms 41 of the driven member 40. A horizontal connecting channel 54 is formed in the other end wall of the spacer, the channel 54 being adapted to receive staking bar 42 which is adapted to be integrally connected with the end arms 41.

The flexible universal joint construction, including the interlocked driving and driven means 32 and 40 and the trapped spacer means 50, is adapted to receive rotative forces from the motor 11 which are transmitted from connection 30 through the driving element 32 and its arms 33 and staking bar 34 to the spacer 50, and then through spacer 50 to the driven element 40 through its integral arms 41 and staking bar 42. Thus it is seen that the driving motion is transmitted from the closed loop driving element 32 through the spacer to the interlocked closed loop driven element 40 which, as represented in this typical showing, transmits the motion to the threaded element 22. With such structure, all of the energy is delivered from the driving side of the flexible joint to the driven side thereof through the deformable resilient spacer element 50. With this structure, sudden surges or variations in load imposed upon the joint means are absorbed in the spacer so that a smoother action is inherent in the drive means here shown. It is to be especially noted, however, that due to the confining of the spacer 50 between the interlocked looped elements 30 and 40, a positive power drive connection is provided, but yet it is one which cushions a sudden loading of the joint through the resilient flexible driving means. A positive transmission of power to the driven means is accomplished in a manner to silently and smoothly produce the desired rotating force. The construction is also operative to protect the driving arrangement from damage and yet keep it under control when a positive stop has been engaged. Thus, the relatively gradual slowing down of the rotating parts of the driving motor is accomplished in such a manner that the braking action is slowly applied to minimize damage to the parts. The interlocking of the looped driving and driven means not only gives the drive connection a positive rotary drive action, but also limits relative longitudinal extension of the drive system to produce a positive stop that has a limited yieldability.

Figure 3:
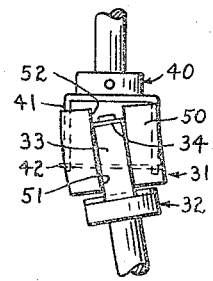
Figure 3 is a detail view of the joint showing it in an exaggerated position under another condition of stress such as might be caused by misalignment of a driving and driven shaft.
Figure 4:
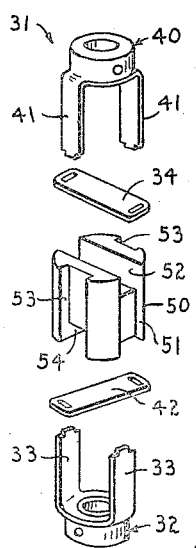
Figure 4 is an exploded view showing the general relationship of the elements which may be used to construct the joint of this invention.

Also incorporated in this universal joint structure is the ability to transmit energy from a driving means to a driven means even though the driving and driven shafts are not directly in line. This action is shown in exaggerated form in Figure 3. Due to the deformable nature of the spacer 50, the force may be transmitted from drive means 11 through the interlocked loop elements 32 and 40. Thus even though a slight binding action might otherwise be encountered due to the resilient deformable action of the spacer 50, the driving power is transmitted through the joint to the driven shaft.

Figure 5:
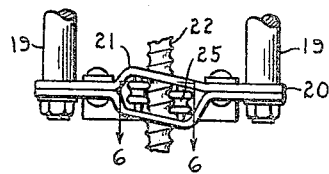
Figure 5 is a showing of a screw-thread follower such as may be used in the mechanism shown in Figures 1 and 2; and, Figure 6 is a view taken on line 6—6 of Figure 5.
Figure 6:
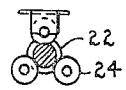
Figure 2:
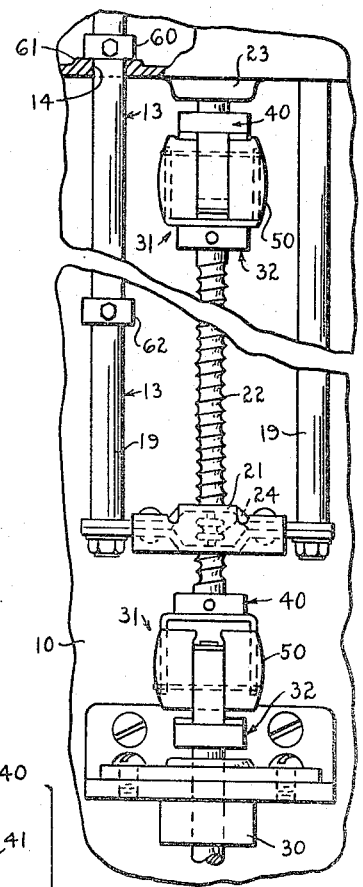
Figure 2 is a view similar to Figure 1 but showing the joint of this invention in the condition of having absorbed and dampened a substantial shock load.

Referring to Figure 2, the spacer means 50 is shown under the condition where carriage 13 has been driven downwardly until the stop 60 is engaged against the stop means 61 integral with door panel 10. When the carriage is reciprocated downwardly to the end of its run by the cooperation of bearings 24 carried in housing 21 with the screw thread 22, the deformable spacer means 50 takes up the shock when the carriage 13 is instantaneously stopped, while the joint is operative to a relatively gradually slowing down of the screw-thread element 23, the drive to shaft 22, and the motor. In the construction shown, the pair of deformable elements 50, associated with the joints disposed at the opposite ends of shaft 22, cushion the stopping action so that the rotating parts can be stopped relatively gradually without the imposition of any unduly heavy forces. As the shaft 22 tends to rotate with the motor and since the carriage 13 is stopped because of stop 60 engaging the fixed stop 61, the dissipation of the forces tends to elongate shaft 22 so that the interlocked looped members 32 and 40 are pulled apart relatively whereby the spacer element 50 is compressed causing it to be deformed to such an extent that it acquires a somewhat barrel shape. It is obvious that a similar dampening and stopping action results when stop 62 is driven upwardly against stop 61. It is this deformable coaction of spacer 50 with the interlocked looped members which provides the positive drive and stopping action, but which through the deformable nature of the spacer permits the stopping action to be spread over a period of time whereby the forces may be more slowly dissipated than is the characteristic of this construction that contributes to its utility and eliminates the possibility of doing injury to any of the parts of the drive line here shown.

As indicated above, this joint construction may be used in various other applications where relative motions which must be controlled are encountered and wherein it is desired that shock loads be dampened or absorbed. This flexible joint finds particular application in situations where a positive transfer of rotative energy is desired along with the dampening action described above. The cooperating interlocked loop means provide the positive drive action, and the trapped spacer means 50 makes it possible to transmit the driving forces from one side of the system to the other.

The driving system used to exemplify the invention is a typical showing of one manner of using this invention and is not to be construed as a limitation of the invention. Modifications thereof may occur to others skilled in the art, all of which may fall within the scope of the following claims.

I claim:

1. A universal joint having a driving side and driven side comprising a pair of interlocking closed loop means, one of said pair being connected to said driving side and the other to said driven side, and a deformable and resilient body of elastomeric material trapped between said interlocked loop means to be embraced thereby and dispose the loop means forming said pair in permanently spaced relationship while permitting limited relative rotation and longitudinal movement to take place between said interlocked means, said body means including a pair of seat portions interfitting respectively with said pair of loop means to assist in controlling the relative rotative and longitudinal movement thereof whereby to transmit motion positively from said driving side to said driven side through the joint which simultaneously accommodates limited universal flexibility and limited longitudinal adjustments to take place between said pair of loop means while dampening the transmission of shock loads.

2. A surge-dampening and flexible coupling adapted to be positioned between a rotatable driving and driven means where sudden starts and stops may be encountered comprising a closed coupling connector fixed to said driving means, a closed coupling connector fixed to said driven means, said coupling connectors being closed about each other but being of a size to be spaced from each other at all points, and a resilient body of elastomeric material disposed in the space formed between said connectors, said body serving to positively space one connector from the other under all normal conditions of use.

3. A flexible joint adapted for the transmission of rotating motion and dampening of shock loads as between driving and driven elements comprising a pair of rigid interlocked loop members, said members being spaced on from another and being connected respectively with said driving and driven elements, and a body of tough resilient material cooperating with said members, said body being shaped to be disposed between said pair of members to hold each one spaced from the other whereby rotary motion may be positively transmitted from one of said pair of members to the other by transferring all of the energy through said body, said construction providing a joint adapted to transmit motion from one element to another while simultaneously absorbing shock loads by permitting limited relative longitudinal and rotational movement to take place between said interlocked members.

4. A flexible joint adapted for the transmission of rotating motion and dampening of shock loads as between a driving and driven element comprising a pair of rigid interlocked loop members, said members being spaced laterally and longitudinally one from another and being connected respectively with said driving and driven elements, and a body of tough resilient material cooperating with said members, said body being shaped to be disposed between and fill the space provided between said pair of members to hold each one resiliently spaced from the other whereby rotary motion may be yieldingly but positively transmitted from one of said pair of members to the other by transferring all of the energy through said body, said construction providing a joint adapted to transmit motion from one element to another while simultaneously absorbing shock loads by permitting limited relative longitudinal and rotational movement to take place between said interlocked members.

5. A universal joint having a driving side and a driven side, comprising a pair of interlocking closed loop means, one of said pair being connected to said driving side and the other of said pair being connected to the driven side, said loops each taking the form of a generally U-shaped stirrup closed by a cross piece having a length to extend thereacross, said loops being interlocked with their respective cross pieces disposed at approximately right angles, said pair of interlocked loop means being spaced laterally and longitudinally one from another, a rubberlike body disposed between said spaced loop means, said body being generally cylindrically shaped, said cylindrical body having a length longer than said longitudinal spacing between the loop means and said cylindrical body having a diameter longer than the length of said cross piece, said cylindrical body having a first groove in one end wall and a pair of parallel and longitudinally disposed grooves in the cylindrical wall thereof, said longitudinal grooves connecting with the opposite ends of said first groove and leading from said first groove along said cylindrical wall to the other end of the body, said parallel grooves and the connecting first groove being adapted to receive one of said stirrup-shaped loop means with its cross piece carried in said first groove, said other end wall of said cylindrical body having a corresponding groove formed therein for receiving the cross piece of the other of said pair of loop means, said corresponding groove being disposed generally at right angles with respect to said first groove, and another pair of parallel and longitudinally disposed grooves in the cylindrical wall of said body connecting with said corresponding groove and extending along said cylindrical wall to said one end of the body, said another pair of grooves and said corresponding groove being adapted to receive the other of said stirrup-shaped loop means with its cross piece being disposed in said corresponding groove, whereby a flexible joint results which provides a connection between a driving and driven side that cushions energy surges and dampens shock loads.

6. A torque-transmitting cushioning flexible coupling adapted to be positioned between rotatable driving and driven means for a window lift structure comprising reversely opposed and operatively associated interlocking members, one of said members being adapted to be attached to said rotatable driving means connected to a power source, the other of said members being adapted to be attached in driving relationship to said driven means, said driving and driven means including shafts arranged to be substantially coaxial, and a resiliently reactive cushioning block being embraced in interlocked and opposed relationship by said interlocking members, said block being resiliently reactive both axially and radially with relation to said driving and driven shafts, each of said interlocking members having a plurality of extensions engaging the sides of said cushioning block for both radial and axial compression thereof.

7. A flexible coupling adapted to be positioned to cushion the transmission of torque between rotatable driving and driven means comprising reversely disposed and operatively associated interlocking members, one of said members being connected to a driving shaft to be rotated by a power source, the other of said members being connected to a shaft that is to be driven, said driving and driven shafts being spaced apart longitudinally but being disposed generally in axial alignment, and a resilient cushioning block embraced in interlocked torsional relationship by said interlocking members, said cushioning block being resilient both in an axial and radial direction with respect to said driving and driven shafts, each of said interlocking members having means integral therewith for engaging said cushioning member whereby during the transmission of torque from said driving to said driven shafts relative motion between said shafts in axial and radial directions will be resiliently cushioned.

8. A flexible coupling adapted to transmit torque comprising a rotatable mounted driving means and a rotatable mounted driven means, each of said means including reversely disposed and operatively associated interlocking members, said driving and driven means being spaced apart longitudinally but being disposed generally in axial alignment, and a resilient cushioning torsion block embraced in interlocked relationship by said interlocking members, said cushioning block being resilient both in axial and radial directions with respect to the axis of rotation of said driving and driven means whereby during the transmission of torque through said block from said driving to said driven means any situation requiring relative motion between said means in axial and radial directions can be accommodated and such motion will be resiliently cushioned.

References Cited in the file of this patent

UNITED STATES PATENTS

| | | |
|---|---|---|
| 2,030,074 | Poole | Feb. 11, 1936 |
| 2,105,702 | Scholtze | Jan. 18, 1938 |
| 2,219,591 | Hiester | Oct. 29, 1940 |
| 2,502,790 | Jencick | Apr. 4, 1950 |
| 2,537,847 | Neher | Jan. 9, 1951 |
| 2,616,273 | Pringle | Nov. 4, 1952 |
| 2,641,115 | Garrison | June 9, 1953 |
| 2,731,261 | Drum | Jan. 17, 1956 |

UNITED STATES PATENT OFFICE
CERTIFICATE OF CORRECTION

Patent No. 2,951,354 September 6, 1960

John W. Anderson

It is hereby certified that error appears in the printed specification of the above numbered patent requiring correction and that the said Letters Patent should read as corrected below.

Column 1, line 19, for "adpted" read -- adapted --; line 64, for "powdered" read -- powered --; column 3, line 31, for "40," read -- 40 --; column 4, line 69, for "on" read -- one --.

Signed and sealed this 4th day of April 1961.

(SEAL)
Attest: ERNEST W. SWIDER
Attesting Officer

ARTHUR W. CROCKER
Acting Commissioner of Patents